United States Patent
Militz et al.

(10) Patent No.: US 12,447,645 B2
(45) Date of Patent: Oct. 21, 2025

(54) MODIFIED TIMBER

(71) Applicants: Georg-August-Universitat Gottingen Stiftung Offentlichen Rechts, Gottingen (DE); Archroma IP GmbH, Reinach (CH)

(72) Inventors: Holger Militz, Bovenden (DE); Lukas Emmerich, Bovenden (DE); Damien Julien Corpet, Oslon (FR); Pauline Gatounes, Bruyeres sur Oise (FR)

(73) Assignees: Georg-August-Universitat Gottingen Stiftung Offentlichen Rechts, Gottingen (DE); Archroma IP GmbH, Reinach (CH)

( * ) Notice: Subject to any disclaimer, the term of this patent is extended or adjusted under 35 U.S.C. 154(b) by 166 days.

(21) Appl. No.: 17/761,228

(22) PCT Filed: Sep. 17, 2020

(86) PCT No.: PCT/EP2020/075949
§ 371 (c)(1),
(2) Date: Mar. 17, 2022

(87) PCT Pub. No.: WO2021/053059
PCT Pub. Date: Mar. 25, 2021

(65) Prior Publication Data
US 2022/0379517 A1  Dec. 1, 2022

(30) Foreign Application Priority Data
Sep. 18, 2019  (EP) .................................... 19198145

(51) Int. Cl.
| | | |
|---|---|---|
| *B27K 3/02* | (2006.01) | |
| *B27K 3/15* | (2006.01) | |
| *B27K 3/16* | (2006.01) | |
| *B27K 3/52* | (2006.01) | |
| *C09K 21/10* | (2006.01) | |
| *C09K 21/12* | (2006.01) | |

(52) U.S. Cl.
CPC .......... *B27K 3/0214* (2013.01); *B27K 3/0292* (2013.01); *B27K 3/15* (2013.01); *B27K 3/166* (2013.01); *B27K 3/52* (2013.01); *C09K 21/10* (2013.01); *C09K 21/12* (2013.01); *B27K 2240/30* (2013.01)

(58) Field of Classification Search
CPC ...... B27K 3/0214; B27K 3/0292; B27K 3/15; B27K 3/166; B27K 3/52; B27K 2240/30; B27K 3/02; B27K 3/16; B27K 3/34; B27K 3/343; B27K 3/00; C09K 21/10; C09K 21/12; C09K 21/00
See application file for complete search history.

(56) References Cited

U.S. PATENT DOCUMENTS

| | | | |
|---|---|---|---|
| 4,410,652 A | 10/1983 | Robinson et al. | |
| 2008/0223360 A1 | 9/2008 | Kingma et al. | |
| 2019/0119507 A1* | 4/2019 | Reinert | .................. C09K 21/04 |

FOREIGN PATENT DOCUMENTS

| | | | |
|---|---|---|---|
| CN | 1898333 A | | 1/2007 |
| CN | 101277798 A | | 10/2008 |
| CN | 102975246 A | | 3/2013 |
| CN | 106363738 A | * | 2/2017 |
| JP | S5033636 A | | 3/1975 |
| JP | S5033696 A | | 3/1975 |
| JP | H04028503 A | | 1/1992 |
| JP | 2006502879 A | | 1/2006 |
| JP | 2009510244 A | | 3/2009 |
| KR | 1020050097913 A | | 10/2005 |
| KR | 1020080059284 A | | 6/2008 |
| KR | 20140023469 A | * | 2/2014 |
| WO | 9100327 A1 | | 1/1991 |
| WO | 2018221567 A1 | | 12/2018 |

OTHER PUBLICATIONS

CN-106363738-A, machine translation (Year: 2017).*
Difference between halogens and halides. Madhu. [retrieved from the internet at Sep. 27, 2024 from <URL:https://www.differencebetween.com/difference-between-halogens-and-halides/#google_vignette>] (Year: 2018).*
KR-20140023469-A, machine translation (Year: 2014).*
PubChem. Monoguanidine phosphate [retrieved from the internet on Feb. 12, 2025 from <URL:https://pubchem.ncbi.nlm.nih.gov/compound/1763-07-1>]. (Year: 2005).*
PubChem. Dimethyloldihydroxyethyleneurea [retrieved from the internet on Feb. 12, 2025 from <URL:https://pubchem.ncbi.nlm.nih.gov/compound/15824>]. (Year: 2005).*
IUPAC. moiety [retrieved from the internet Jun. 6, 2025 from <URL:https://goldbook.iupac.org/terms/view/M03968>] (Year: 1994).*
Japanese Patent Office, Office Action issued in JP 2022-517138 dated Oct. 31, 2023, 7 pages (with English translation).

(Continued)

*Primary Examiner* — Amber R Orlando
*Assistant Examiner* — Marites A Guino-O Uzzle
(74) *Attorney, Agent, or Firm* — Wood Herron & Evans LLP

(57) ABSTRACT

The invention relates to a treatment composition for timber or wood including fire-retardant and either a crosslinking agent or a fixing agent or both, whereby the composition is boron- and halogen-free.

11 Claims, 14 Drawing Sheets

(56) References Cited

OTHER PUBLICATIONS

European Patent Office, Office Action issued in EP 19198145.5 dated May 4, 2022.
Canadian Patent Office, Office Action issued in CA 3,154,311 dated Sep. 14, 2023.
Chinese Patent Office, Office Action issued in CN 202080064679.4 dated Sep. 28, 2023.
European Patent Office, Office Action issued in EP 20771566.5 dated Sep. 6, 2023.
Chilean Patent Office, Office Action issued in Chilean Pat. App. No. 202200650 dated Jul. 12, 2023.
PCT Office, International Search Report issued in PCT/EP2020/075949 dated Oct. 19, 2020.
Chilean Patent Office, Office Action issued in Chilean Pat. App. No. 202200650 dated Jan. 10, 2024.
Chinese Patent Office, Office Action issued in CN 202080064679.4 dated Feb. 25, 2023.
Japanese Patent Office, Office Action issued in JP 2022-517138 dated Apr. 23, 2024.
Japanese Patent Office, Office Action issued in JP 2022-517138 dated May 23, 2024.
Brazilian Patent Office, Office Action issued in BR 112022004958-7 dated Jun. 10, 2024.
Japanese Patent Office, Office Action issued in JP 2022-517138 dated Oct. 29, 2024.
Korean Patent Office, Office Action issued in KR 10-2022-7012318 mailed Apr. 24, 2025.

\* cited by examiner

US 12,447,645 B2

MODIFIED TIMBER

The present invention relates to the field of modified timber, especially timber that is treated with fire-retardant agents.

Fire resistance plays a pivotal role in the usage of timber and wood products, e.g. in the construction area, especially in buildings and public places such as train stations or airports or the like.

Although fire-retardants are principally known there still is a constant need for new and alternative compositions, their use and methods for the application, especially compositions which avoid borates and/or halogens, if possible, avoid the use of further catalysts and which show high resistance to leaching when exposed outdoors.

This object is solved by a composition according to a preferred embodiment of the present invention.

Accordingly, in one embodiment, a boron-free and halogen-free treatment composition for timber and/or wood and/or wood-based composites is provided, comprising
 a) a fire-retardant comprising the moiety —N—C(=X)—N— with X being O, S and substituted or unsubstituted nitrogen;
 and at least one of the components b) or c):
 b) a cross-linking agent
 c) a fixing agent.

Surprisingly it has been found that by using such a composition for the modification of timber and/or wood one or more of the following advantages can be achieved for most applications within the present invention:

The composition can be easily applied to timber and/or wood which means solid wood and wood-based composites as will be shown later on The composition avoids the use of pollutants and hazardous materials The composition not only increase the fire-resistance of the treated timber or wood, usually also hygroscopicity is decreased as well as the biological durability, dimension stability and surface hardness increased The composition can be used for timber products, such as solid wood, fiber boards, particle boards, plywood, further veneer-based or lamella-based composites and other composites The composition is chemically stable and can be applied to the wood in one step The term "[X]-free" in the sense of the present invention especially means and/or includes that the content of [X] in the composition when applied on the timber or wood is <0.1 wt % (wt/wt of the total composition), more preferred <0.01 wt % and most preferred <0,001 wt %. It is an advantage of the composition according to the invention that flame retardant properties are provided to a wood-containing substrate although the composition according to the invention is halogen-free and/or boron-free.

Halogen means halogen-containing compounds or halogen or halogenides. Halogens include Fluorine, Chlorine, Bromine and/or Iodine. Halogenides include Fluoride, Chloride, Bromide and/or Iodide.

The term "treatment composition" in the sense of the present invention especially means and/or includes that after application the composition penetrates at least parts of the timber, in the best case completely/fully penetrates the timber and/or wood to be treated; this will be described in more detail later on.

The term "timber and/or wood" in the sense of the present invention especially means and/or includes both solid wood and wood-based composites which can be fiber-based, particle-based or veneer-based or lamella-based.

The term "timber" as used within the context of the present application is to be understood to especially encompass applications in which the wood has already been subjected to some kinds of physical or chemical treatments, such as drying procedures, sawing procedures, pressing procedures or the like.

The term "wood" as used within the context of the present application especially includes and/or encompasses compounds comprising or essentially consisting of cellulose and hemicelluloses, and lignin. Thus, the term "wood" encompasses fresh wood, recycled wood, and the like.

The composition according to the invention has the advantage of increasing the durability, dimension stability and surface hardness of the wood and/or timber. Therefore, preferred sources for the wood and/or timber are selected from sapwood of *Pinus sylvestris* L., *Pinus radiata* D. Don, European beech L., *Populus* spp. L., *Alnus* spp. L. or mixtures thereof.

The term "essentially consisting of" in the sense of the present invention especially means (in wt/wt, wherever applicable) >90%, preferably >95%, more preferably >97% and most preferred >99%.

In the following the components of the inventive compound will be described in more detail, whereby each combination and preferred embodiment may be combined ad libitum:

a) Fire retardant comprising the moiety —N—C(=X)—N—

As well known in the art the term "Fire retardant" especially means and/or includes a substance that is used to slow or stop the ignition of wood, the spread of fire or reduce its intensity.

Preferably the fire retardant consists essentially of a compound comprising the moiety —N—C(=X)—N— with X being O, S and substituted or unsubstituted nitrogen.

X can comprise substituted nitrogen, preferably substituted with hydrogen, $C_1$ to $C_6$ linear or branched or cyclo alkyl, or $C_1$ to $C_6$ linear or branched or cyclo aryl It is preferred that X signifies O, NH or N(phenyl).

Preferably, the fire retardant includes a urea and/or guanidine moiety. In case the urea or guanidine is not present in the fire-retardant as a compound then alkyl or aryl substituted ureas or guanidines are especially preferred. The substituents of the substituted urea and/or guanidine moiety are selected from $C_1$ to $C_6$ linear or branched or cyclo alkyl, or $C_1$ to $C_6$ linear or branched or cyclo aryl. $C_6$-cyclo aryl (phenyl) is especially preferred as substituent.

The fire retardant can be present in the composition according to the invention as salt. In case the fire retardant is designed as salt, the —N—C(=X)—N— moiety carries one or more positive charges, i.e. the —N—C(=X)—N— moiety forms the cation. Suitable anions for balancing the positive charge of the —N—C(=X)—N— moiety can be selected from carbonates and/or phosphates, wherein phosphates are most preferred. The term "carbonate(s)" as used within the context of the present application refers to anions of the chemical formulae $HCO_3^-$ and $CO_3^{2-}$. The term "phosphate(s)" as used within the context of the present application refers to anions of the chemical formulae $H_2PO_4^-$, $HPO_4^{2-}$, and $PO_4^{3-}$, wherein $HPO_4^{2-}$ and $H_2PO_4^{3-}$ are most preferred.

Particularly preferred flame retardants designed as salt are urea, guanidine and phenylguanidine salts, in particular salts consisting of one or more guanidine and/or phenylguanidine cations and one or more anions selected from carbonates and phosphates.

Preferred fire-retardants are urea, guanidine and phenylguanidine salts, more preferred guanidine and phenylguanidine carbonates and phosphates Especially preferred are the flame retardants according to the following formulae (a) to (c) or mixtures thereof:

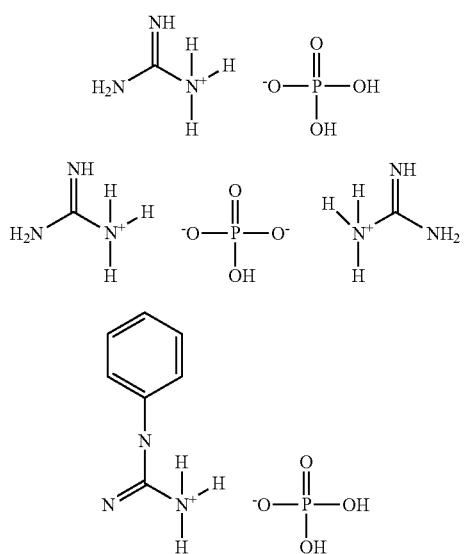

According to a preferred embodiment of the present invention, the fire retardant may additionally comprise a phosphate compound.

The term "phosphate compound" especially means and/or includes any compound in which phosphor (V) to which four oxygens are bound, is present. The term "phosphate compound" therefore especially means/and or includes phosphate anions, phosphate esters, polyphosphates and their esters as well as phosphoric acid.

For many applications it has been shown that this furthermore increases the fire-retarding properties of the inventive composition.

It is an advantage of the composition according to the invention that the combination of the at least one crosslinking agent according to formula (I) and/or fixing agent and the at least one flame retardant to provide flame retardant properties to the wood-containing substrate treated with the composition according to the invention, wherein the flame retardant properties are maintained or reduced only minimally even after the wood-containing substrate treated with the composition according to the invention has been subjected to a treatment with water.

b) Cross-Linking Agent

The inventive composition may comprise a cross-linking agent. The term "cross-linking agent" especially means and/or includes a compound which reacts with the hydroxyl groups from cellulose and hemicelluloses of the timber and/or wood to be treated under elevated temperatures and/or leads to polymerization in wood via condensation reactions of reactive hydroxymethyl groups.

According to one embodiment of the present invention, the cross-linking agent comprises a 2-imidazolidone moiety, preferably it consists essentially thereof. Preferred are especially the following compounds of structure (I):

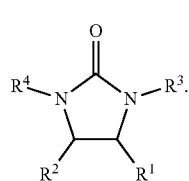

whereby $R^1$ and $R^2$ are independently from each other OH and $OR^5$ whereby $R^5$ (for every residue independently) is $C_1$-$C_5$ alkyl, with methyl being especially preferred, —$CH_2O$—$C_nH_{2n}$—OH and —$CH_2O$—$C_nH_{2n}$—O—$C_mH_{2m}OH$ with n and m being independently 2 or 3, with 2 being preferred; $R^3$ and $R^4$ are independently from each other hydrogen, $R^5$ (for every residue independently), —$CH_2OR^5$ (for every residue independently) and $CH_2OH$.

Preferably at least two of $R^1$, $R^2$, $R^3$ or $R^4$ are or contain a terminal OH moiety.

Preferably $R^1$ and $R^2$ are identical, in particular it is preferred that $R^1$ and $R^2$ are OH. Preferably $R^3$ and $R^4$ are identical The term "alkyl" encompasses linear alkyl as well as branched alkyl moieties.

It is preferred that $R^1$ signifies OH and/or $R^2$ signifies OH and/or $R^3$ signifies H, $CH_3$, $CH_2OH$, $CH_2OMe$, $CH_2OC_2H_4OC_2H_4OH$ and/or $R^4$ signifies H, $CH_3$, $CH_2OH$, $CH_2OMe$, $CH_2OC_2H_4OC_2H_4OH$, preferably wherein $R^1$ signifies OH and/or $R^2$ signifies OH and/or $R^3$ signifies H, $CH_3$, $CH_2OH$, $CH_2OMe$ and/or $R^4$ signifies H, $CH_3$, $CH_2OH$, $CH_2OMe$.

Especially preferred are the crosslinking agents according to the following formulae (II) to (IX) or mixtures thereof:

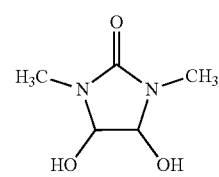

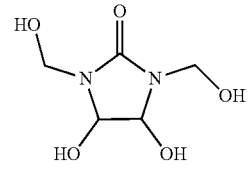

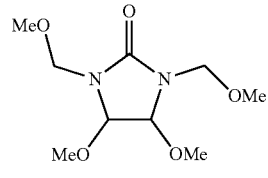

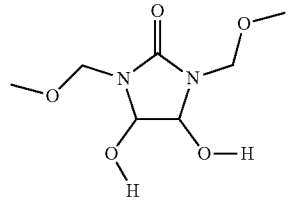

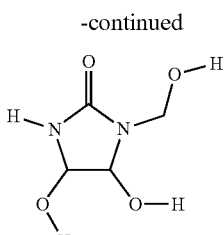

(VI)

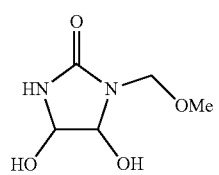

(VII)

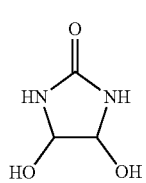

(VIII)

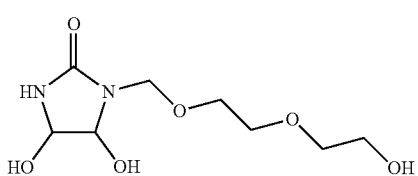

(IX)

According to a preferred embodiment the ratio (in wt/wt) of the fire retardant and the crosslinking agent (whereby when more than one crosslinking agent and/or fire retardant is present this relates to the total weight) is ≥0.05:1 to ≤10:1, preferably ≥0.2:1 to ≤2:1. This has been shown to be advantageous for many applications within the present invention.

The crosslinking agent according to formula (II) is also referred to as DMeDHEU (1,3-bis-methyl-4,5-dihydroxy-imidazolidine-2-one). The crosslinking agent according to formula (III) is also referred to as DMDHEU (1,3-bis-(hydroxymethyl)-4,5-dihydroxyimidazolidine-2-one).

Particularly preferred compositions according to the invention comprise or consist of a crosslinking agent according to formula (II) (DMDHEU) and monoguanidine phosphate salt as flame retardant, or a crosslinking agent according to formula (III) and monoguanidine phosphate salt as flame retardant, or a crosslinking agent according to formula (IV) (DMeDHEU) and monoguanidine phosphate salt as flame retardant, or a crosslinking agent of formula (V) and monoguanidine phosphate salt as flame retardant, or a crosslinking agent according to formula (II) and a phenyl based guanidine flame retardant of formula (c).

Suitable weight-ratio ranges of flame retardant:crosslinking agent according to formula (I) within the composition according to the invention are at most 1:20, or at most 1:18, or at most 1:16 or at most 1:14 or at most 1:12 or at most 1:10 or at most 1:8 or at most 1:6 or at most 1:5 or at most 1:4 and/or at least 1:0.1 or at least 1:0.2 or at least 1:0.4 or at least 1:0.5 or at least 1:0.7 or at least 1:0.8 or at least 1:0.9 or at least 1:1 or at least 1:1.2 or at least 1:1.4 or at least 1:1.6 or at least 1:1.8 or at least 1:2 or at least 1:2.2 or at least 1:2.4 or at least 1:2.6 or at least 1:2.8 or at least 1:3. Preferred weight-ratio ranges of flame retardant:crosslinking agent according to formula (I) within the composition according to the invention are 1:20 to 1:0.1 or 1:15 to 1:0.5 or 1:10 to 1:1 or 1:5 to 1:1.5 or 1:4 to 1:2.

c) Fixing Agent

The inventive composition may comprise a fixing agent.

The term "fixing agent" as used within the context of the present application especially means/or includes a compound which is capable of contributing to protecting the flame retardant within the wood-containing substrate which is treated with the composition according to the invention against leaching, preferably by forming larger complexes and/or neutralizing positive or negative charges of the flame retardant to reduce the water-solubility of the flame retardant.

According to a further embodiment of the present invention, the fixing agent comprises polyamines, preferably it consists essentially thereof, with Cyanoguanidin-diethylenetriamine containing polymers, especially Cyanoguanidin-diethylenetriamine-epichlorohydrin-polymer being especially preferred. Without being bound to any theory, the inventors believe that the fixing properties of these compounds may—in case the flame-retardant is negatively charged—at least arise out of a complex-formation similarly to the complex described by Yu et al. Modern Applied Science, 2009, Vol. 10, No. 3, 9-16.

The fixing agent is preferably used in an amount of at least 1% by weight up to at most 10% by weight, or at least 3% by weight up to at most 8% by weight, or at least 4% by weight up to at most 7% by weight, wherein the weight % are based on the dry weight of composition according to the invention.

A particularly preferred composition according to the invention comprises or consists of cyanoguanidine-diethylenetriamine-epichlorohydrin as fixing agent and a mixture of potassium dihydrogen phosphate and urea (1:1 ratio) as flame retardant.

According to a preferred embodiment of the present invention, the composition comprises all compounds a) to c).

According to one embodiment the composition furthermore comprises a catalyst which is capable of catalyzing the cross-linking reaction, thus interaction of the cross-linking agent with the timber and/or wood, and condensation reactions of the cross-linking agent itself. This especially aims to enhance the reactivity of cross-linking agents, hence enable a curing of the cross-linking agent in wood at reduced/moderate temperatures (preferably below 130° C.)

Preferred catalysts are selected out of the group comprising metal salts from the group consisting of metal sulfates, metal nitrates, metal phosphates or mixtures thereof. Examples are magnesium nitrate, magnesium sulfate, aluminum sulfate, zinc nitrate or copper nitrate or mixtures thereof.

Suitable and insofar preferred catalysts are also ammonium salts from the group consisting of ammonium sulfate, ammonium oxalate, diammonium phosphate or mixtures thereof.

Further suitable and insofar preferred catalysts are organic or inorganic acids. Suitable examples are maleic acid, formic acid, citric acid, tartaric acid, oxalic acid, p-toluenesulfonic acid, sulfuric acid, nitric acid or mixtures thereof.

Especially preferred is magnesium nitrate.

The at least one catalyst is present in the composition according to the invention in an amount of at least 2% by weight up to at most 10% by weight, or at least 2% by weight up to at most 7% by weight, or at least 2% by weight up to at most 5% by weight, wherein the weight % is based on the dry weight of the composition according to the invention.

However, according to another embodiment of the present invention, the composition is catalyst-free.

The composition according to the invention can further comprise a solvent, wherein the solvent is capable to dissolve the components of the composition according to the invention, in particular to dissolve the at least one cross-linking-agent and/or the at least one flame retardant. Particularly preferred as solvent is water. The term "water" as used within the context of the present application refers to tap water as well as to deionized water.

It is particularly preferred that the composition according to the invention is designed as aqueous solution, i.e. that the at least one crosslinking agent and the at least one flame retardant are dissolved in water thus forming the composition according to the invention.

If the composition according to the invention is designed as solution, the total amount of the at least one crosslinking agent and the at least one flame retardant is at least 0.5 g or at least 5 g or at least 8 g, or at least 10 g, or at least 12 g, or at least 15 g, or at least 18 g, or at least 20 g, or at least 25 g, and/or at most 30 g, or at most 35 g, or at most 40 g, or at most 45 g, or at most 50 g, or at most 55 g, or at most 60 g, or at most 65 g, or at most 70 g, or at most 75 g, or at most 80 g per 100 mL solvent, in particular per 100 mL water. Particularly preferred is a total amount of the at least one crosslinking agent and the at least one flame retardant is 0.5 g to 80 g, or 5 g to 70 g, or 10 g to 60 g, or 15 g to 45 g, or 20 g to 40 g per 100 mL solvent, in particular per 100 ml water.

The present invention furthermore relates to a use of the inventive composition as a treatment agent for timber and/or wood.

The present invention furthermore relates to a timber and/or wood composite material whereby at least a part of the timber and/or wood is impregnated with the inventive composition. Preferably the timber and/or wood is fully impregnated.

The present invention furthermore relates to an application method for applying the inventive composition onto the timber and/or wood to be treated, comprising the steps of
a) Optionally pre-drying the timber and/or wood to be treated
b) Impregnating the timber and/or wood to be treated with an aqueous solution of the inventive composition at elevated pressure
c) Drying the impregnated timber and/or wood The steps of the method will further on be described in more detail, whereby the process conditions especially the applicable pressure during impregnation and the temperature during drying steps strongly depend on the shape and dimension of the raw material (solid wood, veneers, particles, fibers) and the wood species which is going to be treated. Each combination and preferred embodiment may be combined ad libitum:

a) Optional Pre-Drying Step

In step a) the timber and/or wood is optionally pre-dried to increase the absorption capacity for the inventive composition.

Preferably step a) is performed at a pressure of ≥20 mbar to ≤100 mbar, and preferably step a) is performed at room temperature or a temperature of ≥20° C. to ≤140° C.

Alternatively, step a) is performed at atmospheric pressure at a temperature of ≥20° C. to ≤140° C., preferably of ≥50° C. to ≤90° C. This has been shown to be advantageous especially for larger timber and/or wood pieces.

Preferably step a) is performed until wood moisture contents lay in the range of ≥0% to ≤25% b) Impregnating Step

If step a) is performed then step b) preferably immediately follows after step a), whereby "immediately" especially means and/or includes a delay of ≤30 min, preferably ≤10 min.

In case the wood and/or timber has a temperature which is higher than the ambient temperature after having been subjected to the pre-drying step a), the wood and/or timber is allowed to cool down to ambient temperature prior to being subjected to the treatment step b)

In step b) an aqueous solution of the inventive composition is used. Preferably the content of the inventive composition (in g per 100 ml water prior to addition) is ≥0.5 g to ≤80 g, preferably ≥15 g to ≤45 g and most preferred ≥20 g to ≤40 g.

Step b) is preferably performed at a pressure of ≥6 bar to ≤20 bar, preferably ≥8 bar to ≤14 and most preferably ≥10 bar to ≤12 bar c) Drying Step Step c) preferably follows after step b), preferably immediately after step b). In case a cross-linking agent is present, during this step preferably also a curing of the cross-linking agent simultaneously is performed.

Preferably step c) comprises at least two drying steps which are performed at different temperatures with the temperature increasing from each step to the other.

Preferably step c) comprises a first drying step c1) in which drying is performed first at room temperature or a temperature of ≥20° C. to ≤140° C. for ≥12 hrs to ≤504 hrs, preferably ≥24 hrs to ≤272 hrs and most preferred ≥72 hrs to ≤168 hrs. This step preferably follows immediately after step b)

Preferably step c) comprises a second drying step c2) in which drying is performed at a temperature of ≥100° C. to ≤180° C., preferably ≤140° C. for ≥24 hrs to ≤216 hrs, preferably ≥48 hrs to ≤168 hrs. In many applications of the present application it has been shown that in this drying step c2) also simultaneously curing of the cross-linking agent and reactive parts in the fire retardant solutions occurs. Preferably step c2) follows, preferably immediately follows after step c1).

Preferably, the temperature in drying step c2) is higher than the temperature in drying step c1).

According to one embodiment of the present invention, step c) may include a sequence of drying steps, whereby each drying step may have independently a duration of ≥6 hrs to ≤24 hrs and the increase in temperature between each drying step to the next is independently ≥10° C. to ≤30° C.

The aforementioned components, as well as the claimed components and the components to be used in accordance with the invention in the described embodiments, are not subject to any special exceptions with respect to their size, shape, material selection and technical concept such that the selection criteria known in the pertinent field can be applied without limitations.

Additional details, characteristics and advantages of the object of the invention are disclosed in the subclaims and the following description of the respective figures—which in an exemplary fashion—show preferred embodiments according to the invention. Such embodiment does not necessarily represent the full scope of the invention, however, and reference is made therefore to the claims and herein for interpreting the scope of the invention. It is to be understood that both the foregoing general description and the following detailed description are exemplary and explanatory only and are intended to provide further explanation of the present invention as claimed.

Figure 12:
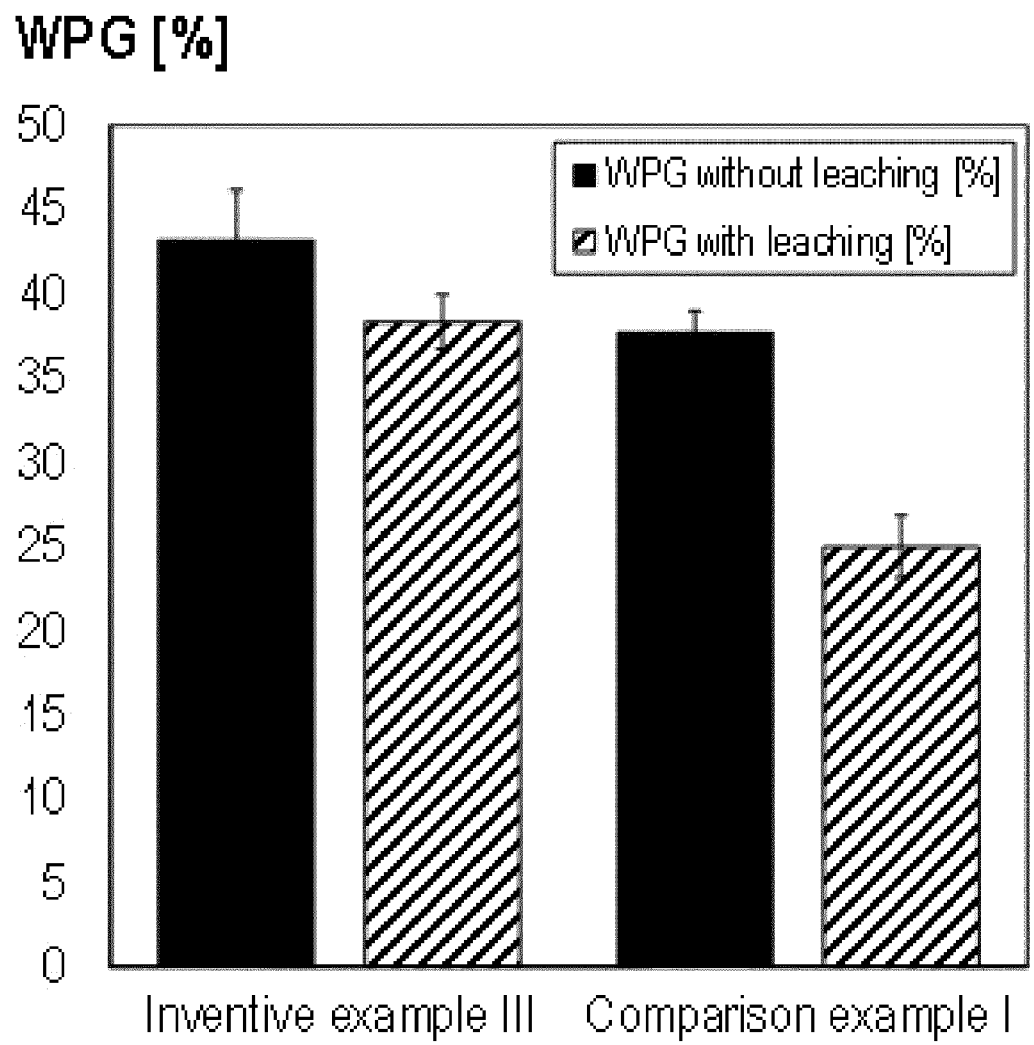
Figure 13:
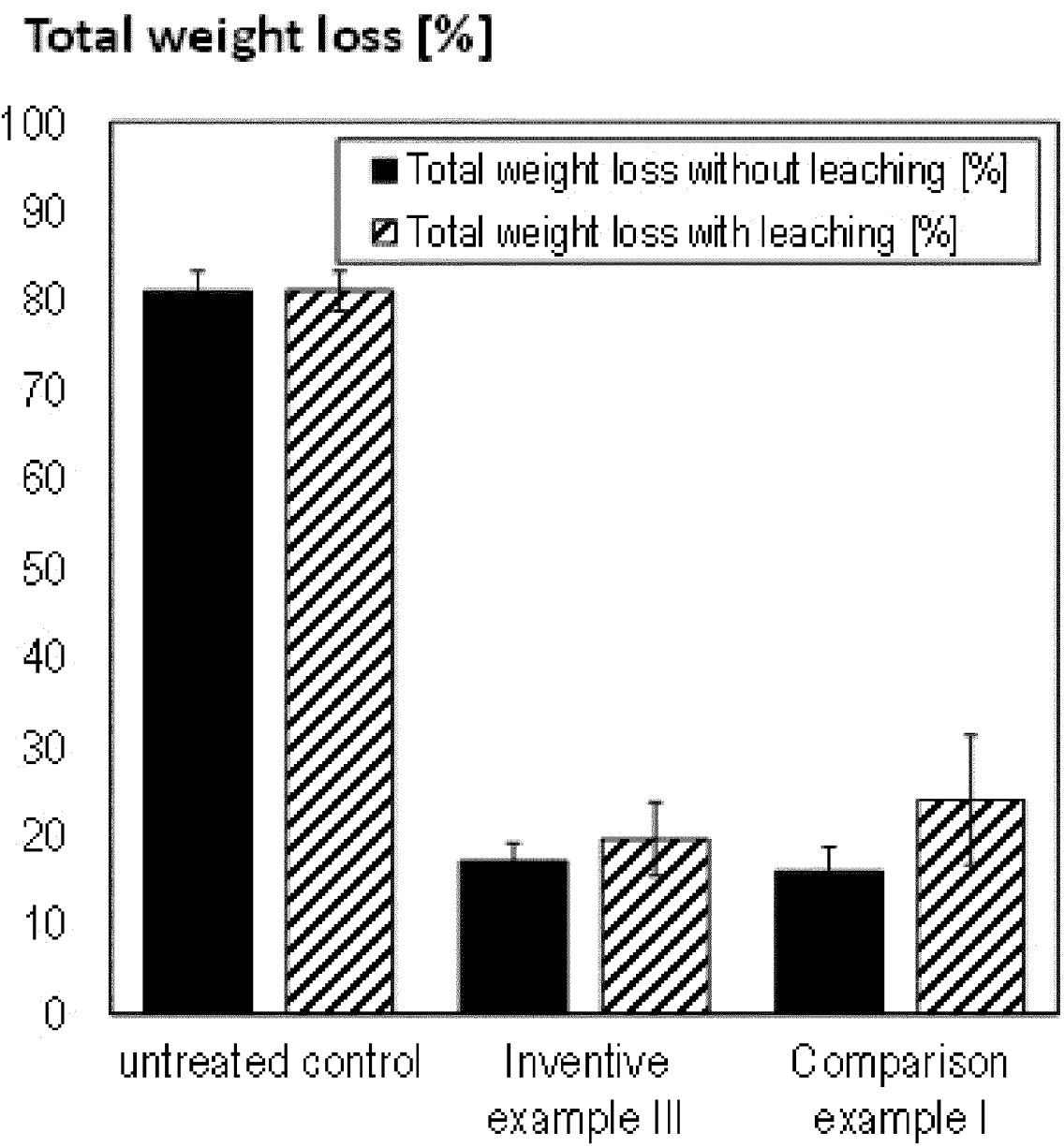
Figure 14:
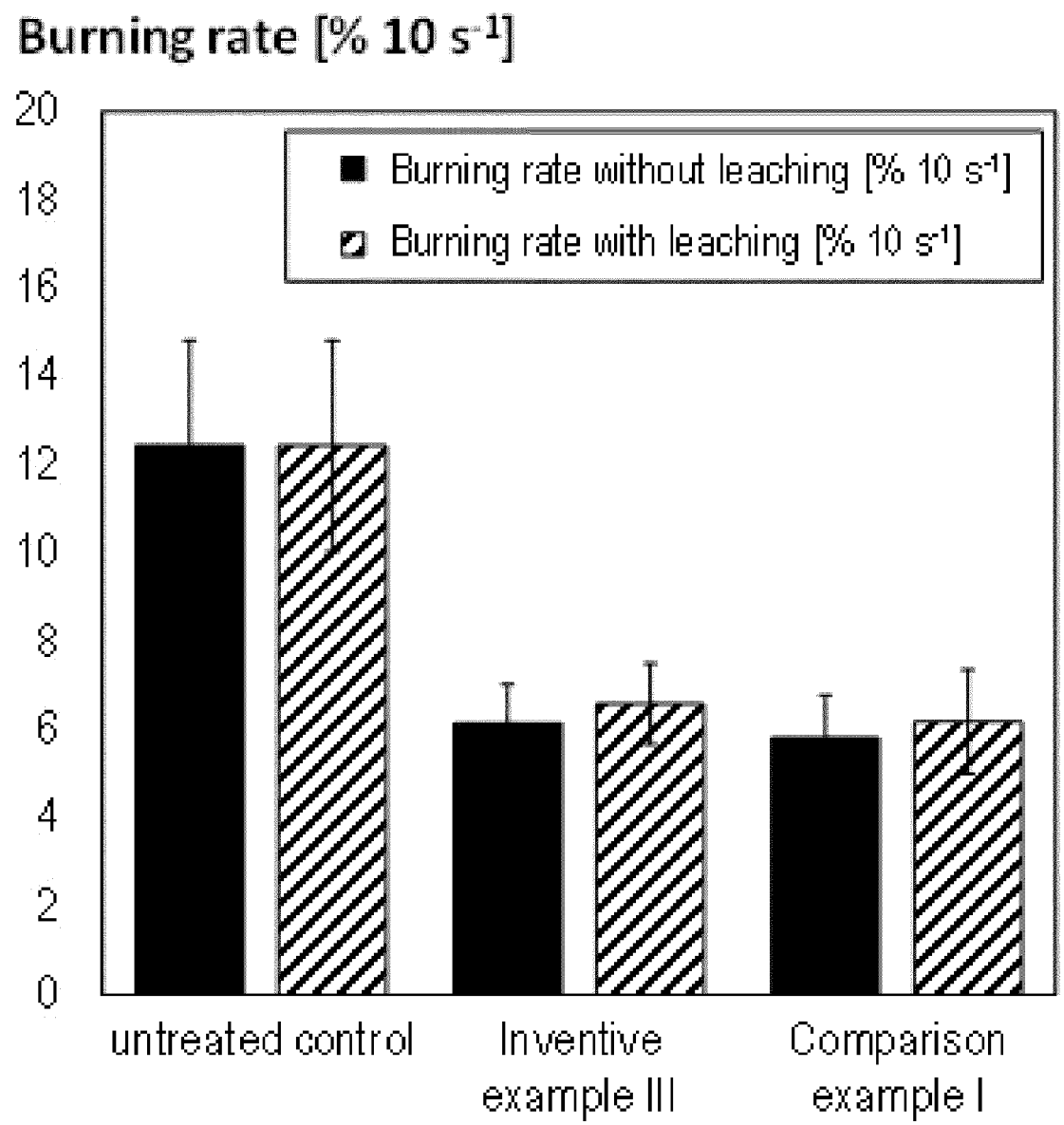

FIG. 12 shows a diagram showing the WPG of one inventive sample and one comparative sample FIG. 13 shows a diagram showing the maximum weight loss of one inventive sample and two comparative samples; and FIG. 14 shows a diagram showing the burning rate of one inventive sample and two comparative samples The invention is furthermore explained by the following examples which are illustrative only and non-binding:

EXAMPLE I

In Example I, an impregnation solution comprising 20 g DMDHEU and 10 g Monoguanidinphosphate per 100 ml water was used. Oven-dry (0% MC) samples of Scots pine sapwood (*Pinus sylvestris* L.) were impregnated with the impregnation solution in a vacuum-pressure impregnation process of 1 hr vacuum at 50 mbar followed by 1 hr overpressure at 12 bar. Fully impregnated samples were first dried at 25° C. for 110 hrs, then drying and curing at 120° C. for 48 hrs in a drying oven occurred.

EXAMPLE II

In Example II, an impregnation solution comprising 9 g of an 1:1 mixture of potassiumdihydrogen phosphate and urea and 19 g cyanoguanidin-diethylenetriamine-epichlorohydrin-polymer was used. Oven-dry (0% MC) samples of Scots pine sapwood (*Pinus sylvestris* L.) were impregnated with the impregnation solution in a vacuum-pressure impregnation process of 1 hr vacuum at 50 mbar followed by 1 hr overpressure at 12 bar. Fully impregnated samples were pre-dried at 25° C. for 12 hrs. Afterwards samples were dried by stepwise temperature increase (12 hrs intervals) at 40° C., 60° C., 80° C. and 103° C. before curing at 130° C. for 5 hrs in a drying oven.

EXAMPLE III

In Example III an impregnation solution comprising 20 g DMDHEU and 5 g Monoguanidinphosphate per 100 ml water was used. The treatment method was identical to Example I.

EXAMPLE IV

In Example IV an impregnation solution comprising 20 g methylolated DMDHEU and 5 g Monoguanidinphosphate per 100 ml water was used. The treatment method was identical to Example I.

EXAMPLE V

In Example V an impregnation solution comprising 20 g DMeDHEU and 5 g Monoguanidinphosphate per 100 ml water was used. The treatment method was identical to Example I.

COMPARATIVE EXAMPLES

As comparative examples
an untreated timber
a timber impregnated with sodium polyborate
a timber impregnated with monoguanidiniumphosphate; and
a timber impregnated with DMDHEU crosslinking agent
a timber impregnated with an impregnation solution comprising 20 g DMDHEU and 5 g Diammoniumphosphate (as fire retardand) per 100 ml water (Comparative Example I)
were used. The impregnation and drying, if applicable, occurred in analogous fashion to Example I.

Leaching Tests

The attribute 'with leaching' marks all samples which were subjected to a 14-days cold water leaching procedure following European Norm EN 84 (1997) before testing respective material characteristics.

Burning Test

All samples were subjected to a "bunsen-burner flaming test". After treatment with the impregnation solutions as described before, dried and cured samples of 13×4×125 (ax.) mm³ were conditioned at 20° C., 65% RH prior testing. The specimens were at one end fixed in a holder forming an angle of 45°. Specimen plus holder were placed on a balance in a way that the specimen was hanging down next to the balance. Before fixing the specimen, the balance was tared and the mass of the conditioned sample measured to the nearest $10^{-3}$ g. Based on this starting weight of the specimen, the moisture content was calculated on the basis of the original dry weight of the wood before treatment. By a Bunsen burner, the specimen's tip was ignited during 30 s of exposure to the flame. The strength and height of the flame of the Bunsen burner was always equal for all specimens. The weight of the specimen was recorded in 10 s intervals and at the same time it was assessed whether the specimen was burning or glowing. The mass loss of the specimens was related to the original oven-dry weight before treatment (pure wood substrate without chemical). Parameters which were calculated in order to assess the fire resistance of respectively treated wood were the maximum mass loss, maximum mass loss per ten-second interval (burning rate), burning time and glowing time. The test was conducted with n=10 specimens per treatment collective.

Swelling and Shrinking Test (Dimensional Stability)

Specimens of 25×25×10 (ax.) mm³ were after treatment with cross-linking agents and/or fire retardants oven-dried at 103° C. until constant mass (0% MC). Oven-dry weights and dimensions were measured and samples subsequently water saturated with demineralised water by applying a vacuum of 100 mbar for 30 min, followed by a storage in demineralised water for 24 hrs. Afterwards dimensions were measured in maximum swollen state and based on the maximum swell rates the Anti-Swell-Efficiency [ASE, %] was calculated by comparing swell rates of modified to those of untreated wood. Specimens were re-dried to oven-dry state and the described ASE cycle repeated four times in order to regard long-term effects of respective treatments on the swelling and shrinking of wood. With increasing cycle number decreasing ASE values would indicate effects of a chemical leaching due to minor fixation.

Water Vapor Uptake and Release

Short-term water uptake and release tests were conducted with specimens of 5×10×100 (ax.) mm³ over a period of 24 hrs. Respective specimens were oven-dried and weighed to the nearest $10^{-3}$ g and stored for 24 hrs. in 100% RH at 25° C. Afterwards the water vapor uptake ($W24_{100\% RH}$ [%]) was calculated. Samples were stored for another 14 days in 100% RH and weighed again at approx. fiber saturation. After that, specimens were exposed directly on freshly activated silica gel and weighed again after 24 hrs. The water vapour release ($W24_{0\% RH}$ [%]) during 24-h exposure was calculated. Specimens were again oven-dried at 103° C. until constant mass, weighed to the nearest $10^{-3}$ g and submerged in demineralised water at surrounding climate of 25° C., 65%. After 24 hrs. submersion samples were weighed again and the liquid water uptake [$W24_{submered}$] calculated.

Results

Figure 1:
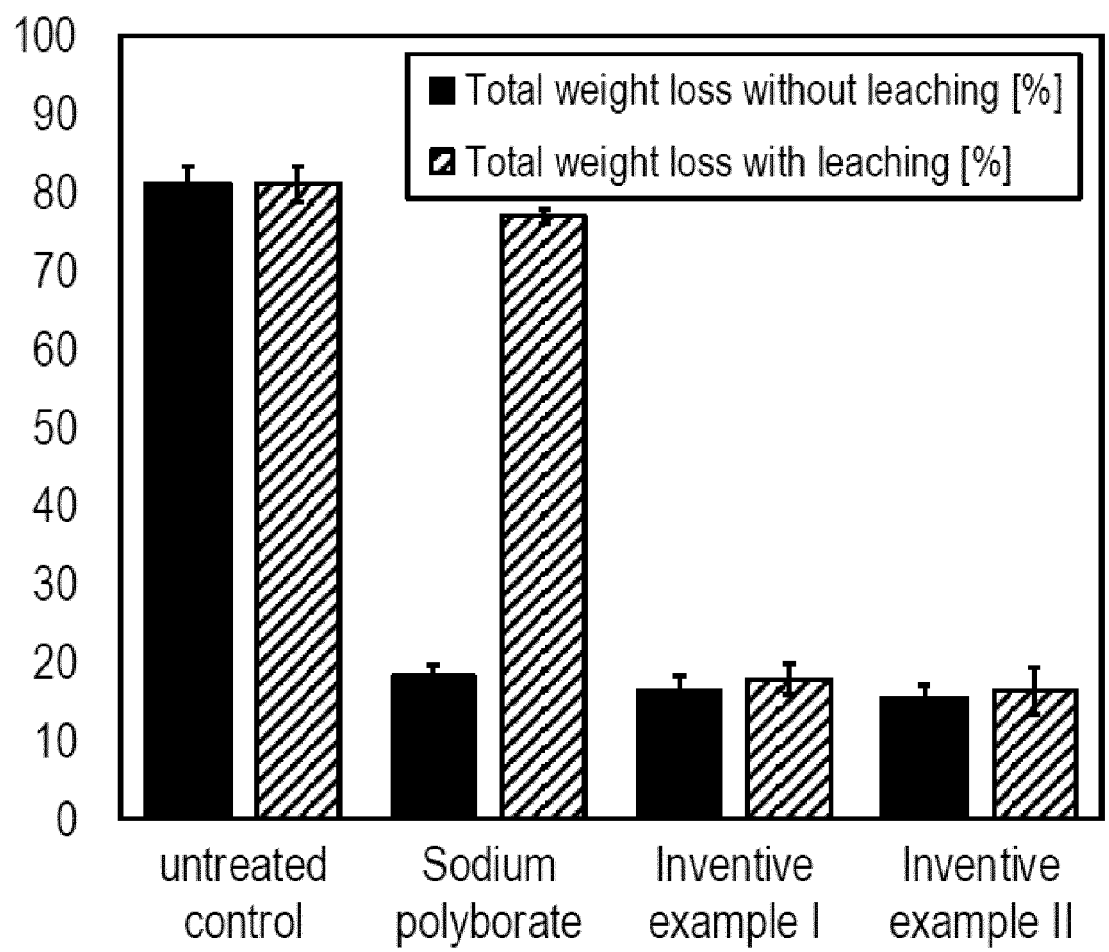
FIG. 1 shows a diagram showing the maximum weight loss of two inventive and two comparative samples
Figure 2:
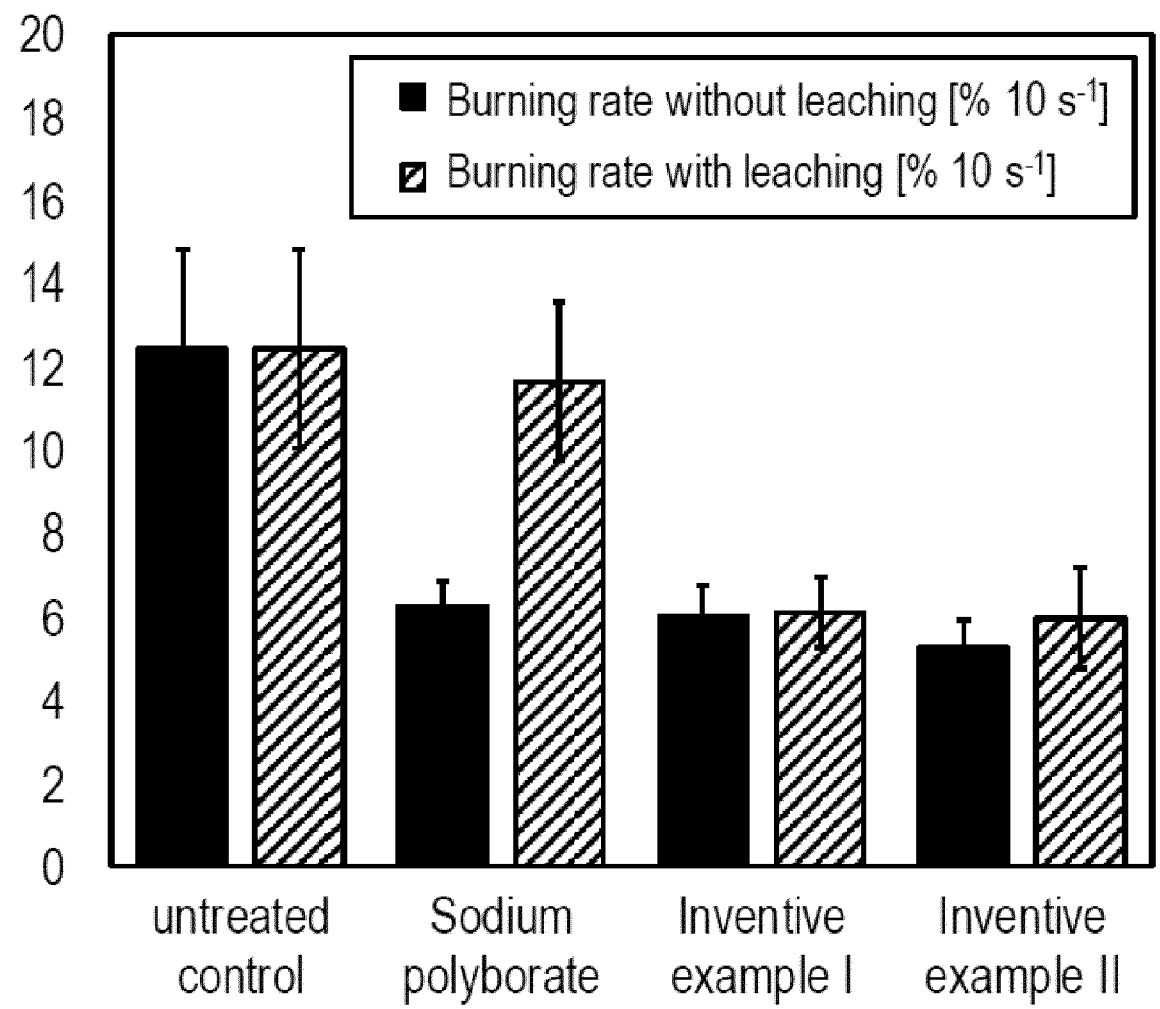
FIG. 2 shows a diagram showing the burning rate for the specimen of FIG. 1
Figure 3:
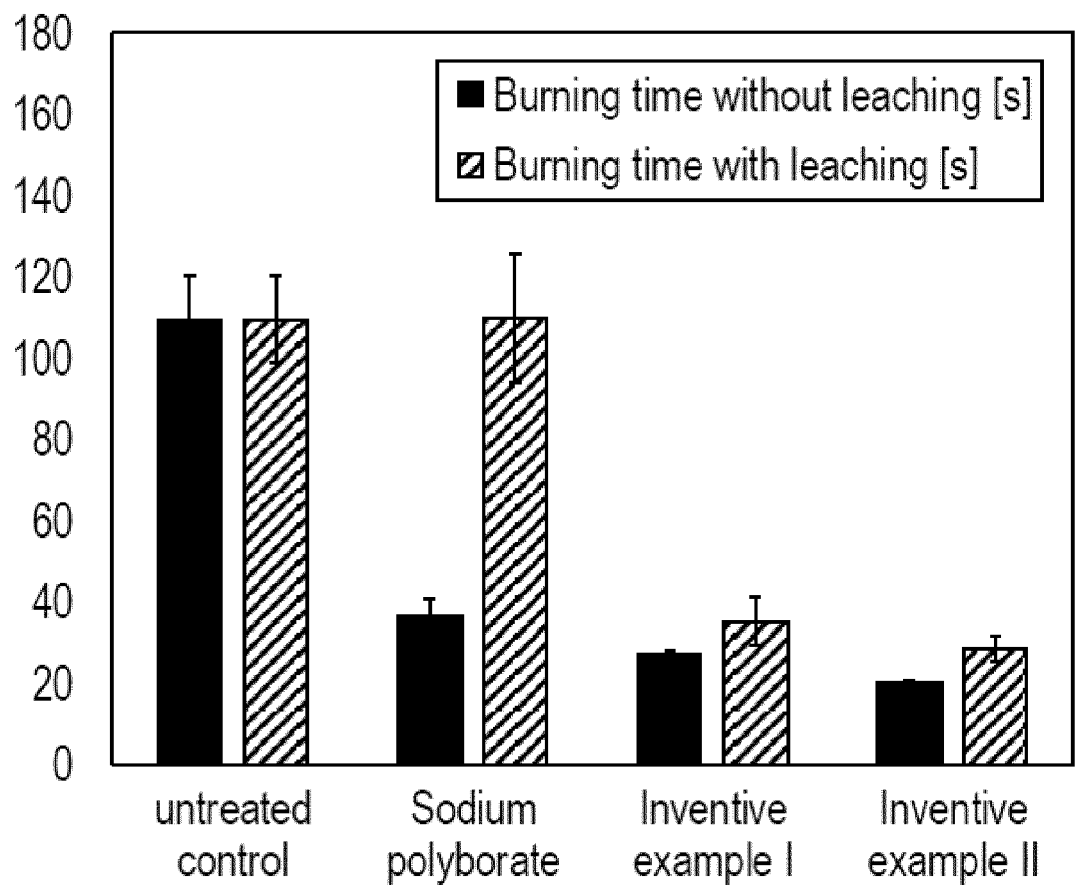
FIG. 3 shows a diagram showing the burning time for the specimens of FIG. 1
Figure 4:
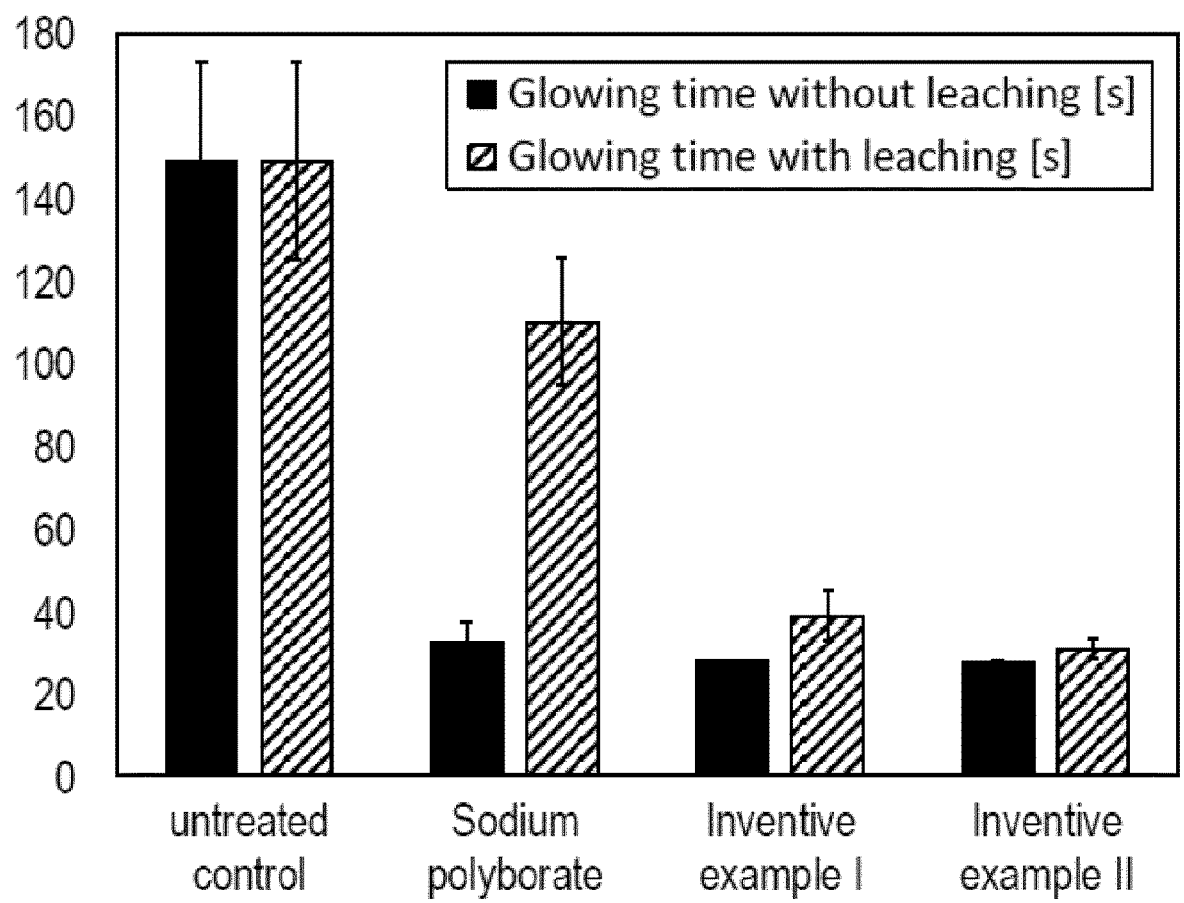
FIG. 4 shows a diagram the glowing time for the specimens of FIG. 1

FIG. 1 shows a diagram showing the maximum weight loss of two inventive and two comparative samples which were tested both before and after leaching according to EN 84 (1997), FIGS. 2 to 4 show the burning rate, burning time and glowing time of the samples of FIG. 1. As can be seen the inventive samples show an increased fire-retarding behaviour.

Figure 5:
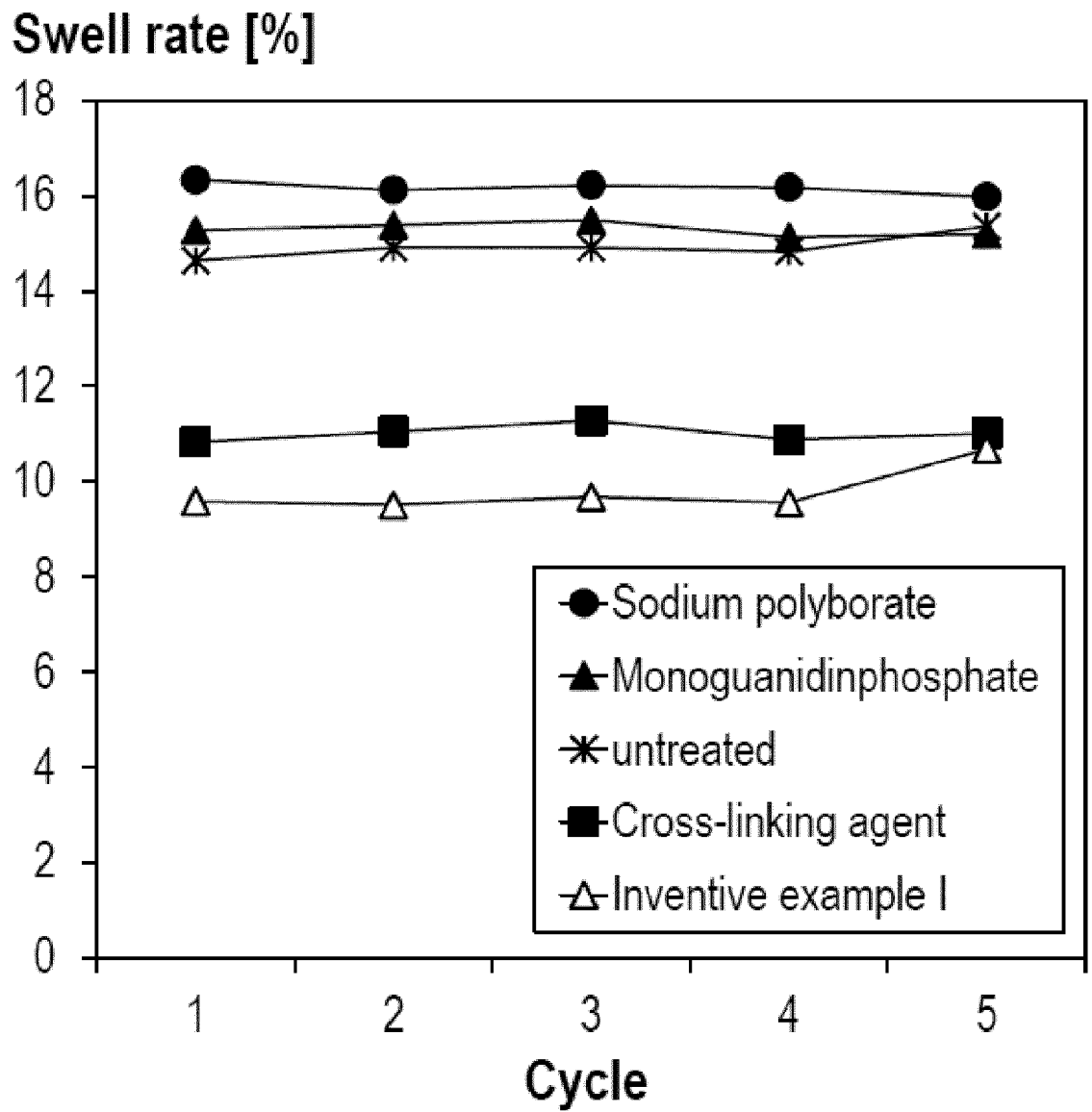
FIG. 5 shows a diagram showing the maximum swell rates of one inventive and four comparative samples.
Figure 6:
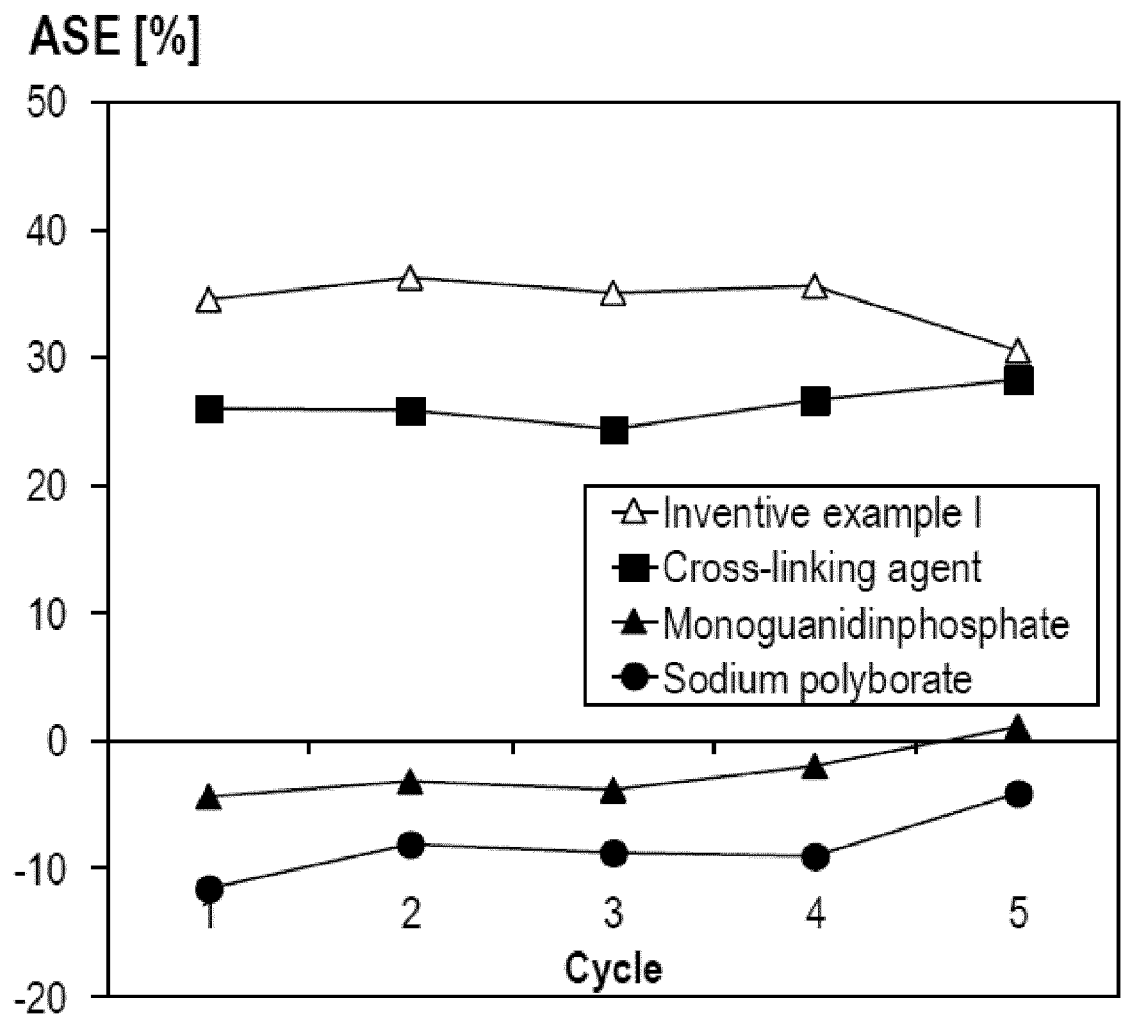
FIG. 6 shows a diagram showing the Anti Swell Efficiency (ASE) of the samples of FIG. 5.
Figure 7:
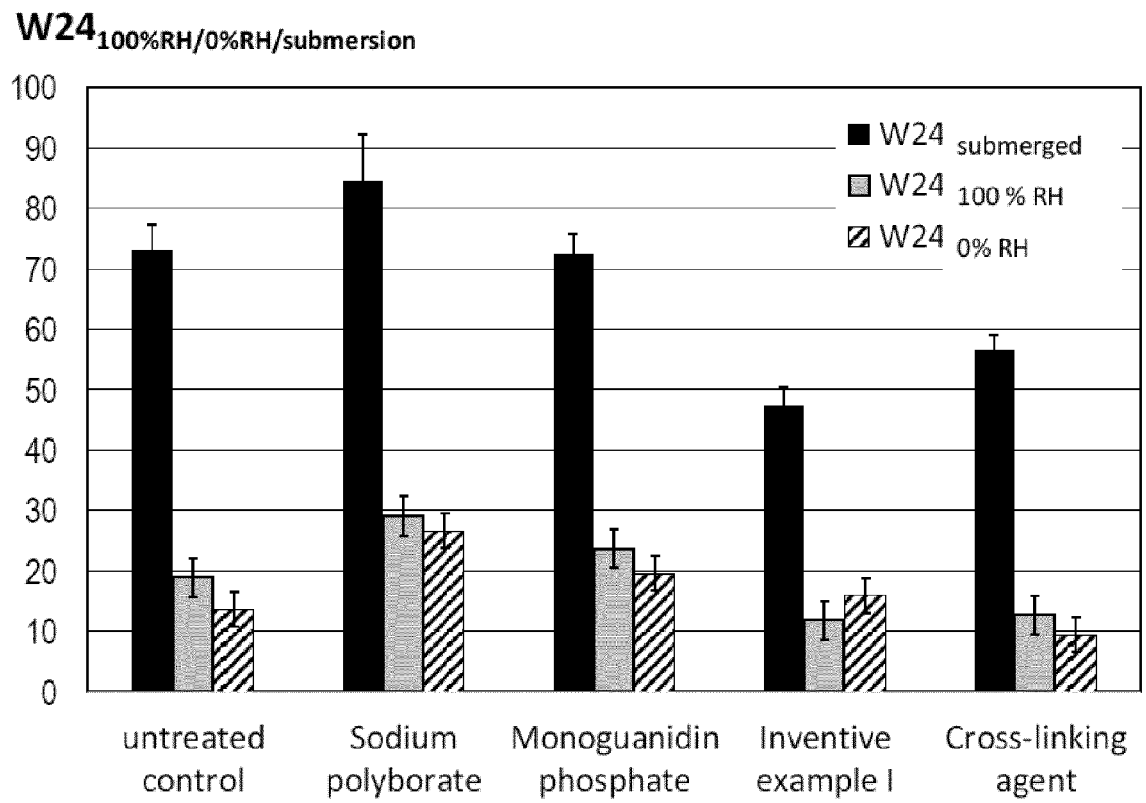
FIG. 7 shows a diagram showing the water vapor uptake ($W24_{100\% \ RH}$), water vapor release ($W24_{0\% \ RH}$) and liquid water uptake ($W24_{submerged}$) for the specimen of FIG. 5

FIG. 5 shows a diagram showing the maximum swell rates of one inventive and four comparative samples on which basis the Anti Swell Efficiency (ASE) was calculated for samples previously leached according to EN 87 (1997), which is shown in FIG. 6. FIG. 7 is a diagram showing the water vapor uptake ($W24_{100\% RH}$), water vapor release ($W24_{0\% RH}$) and liquid water uptake ($W24_{submerged}$) for the specimen of FIG. 5 which were tested without being leached according to EN 84 (1997). The improved effect of the inventive samples can clearly be observed.

Figure 8:
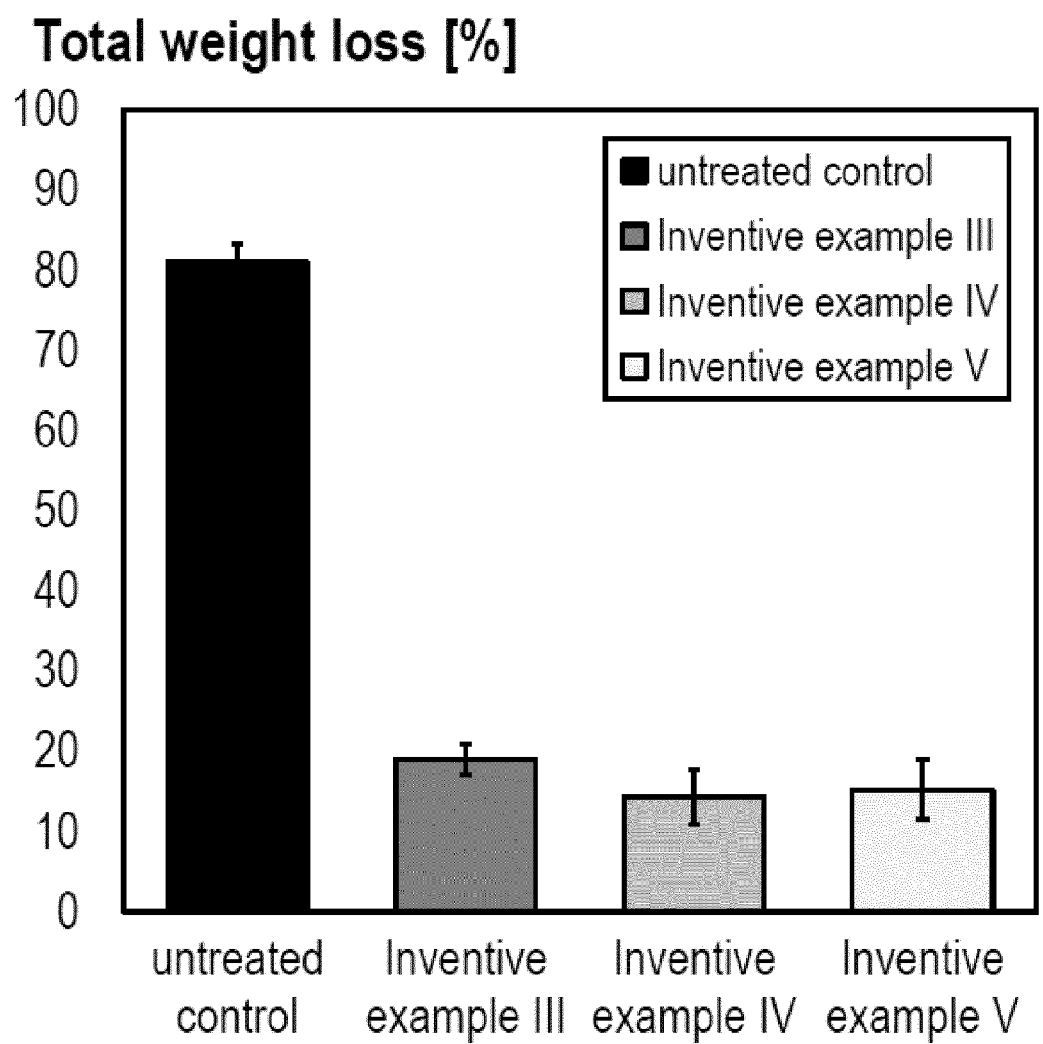
FIG. 8 shows a diagram showing the maximum weight loss of three inventive samples and one comparative sample
Figure 9:
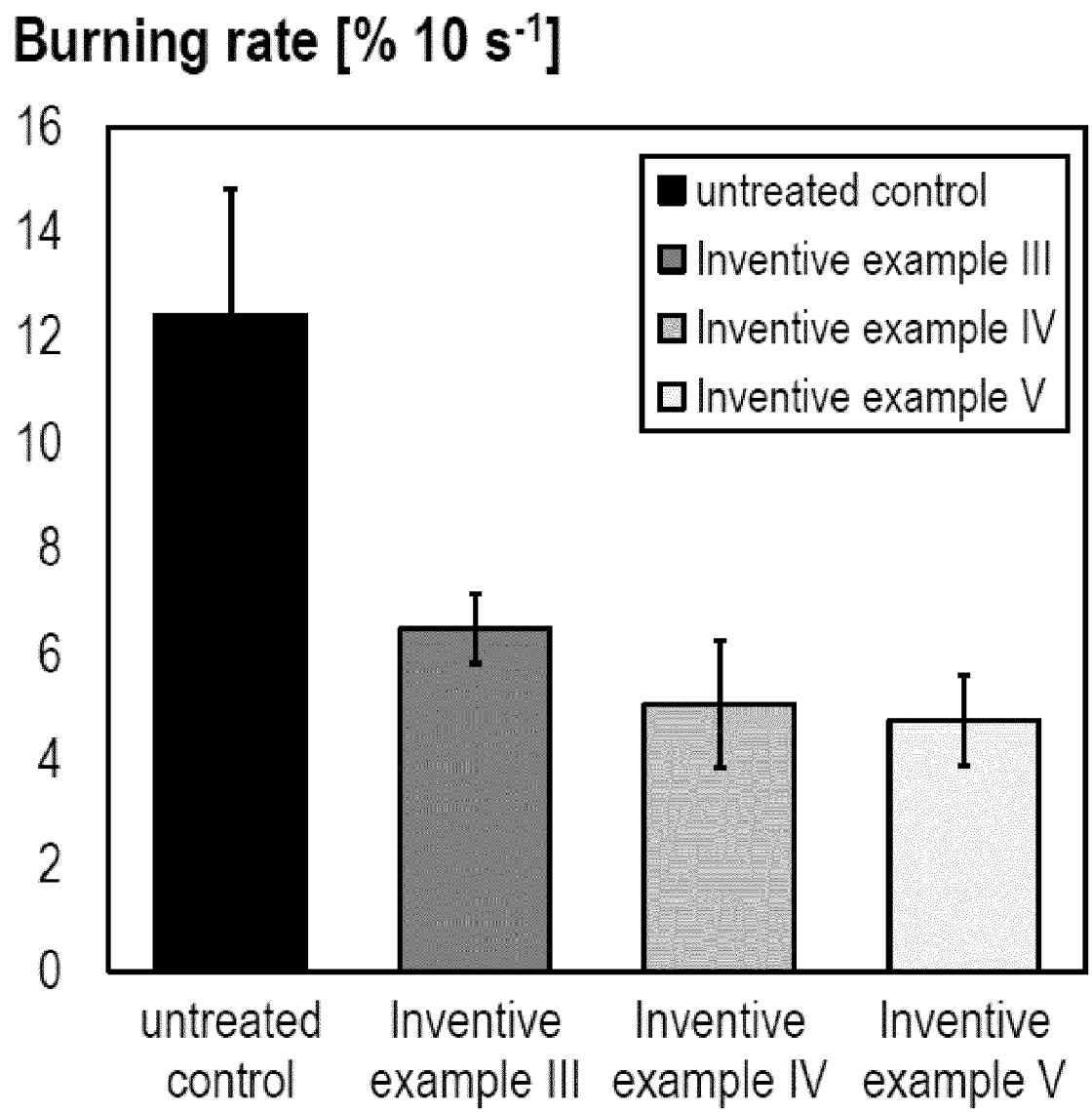
FIG. 9 shows a diagram showing the burning rate of the samples of FIG. 8
Figure 10:
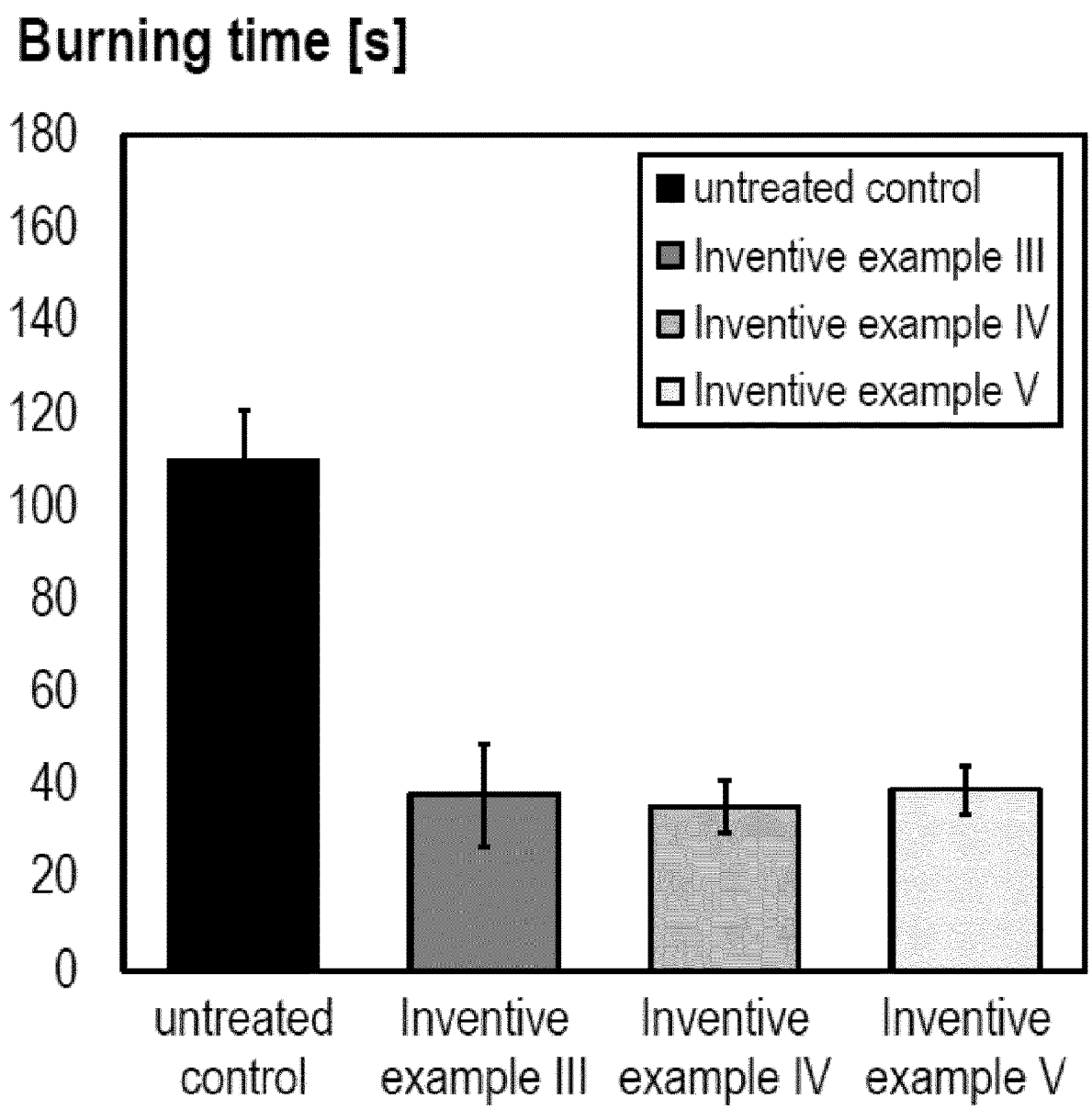
FIG. 10 shows a diagram showing the burning time of three inventive samples.
Figure 11:
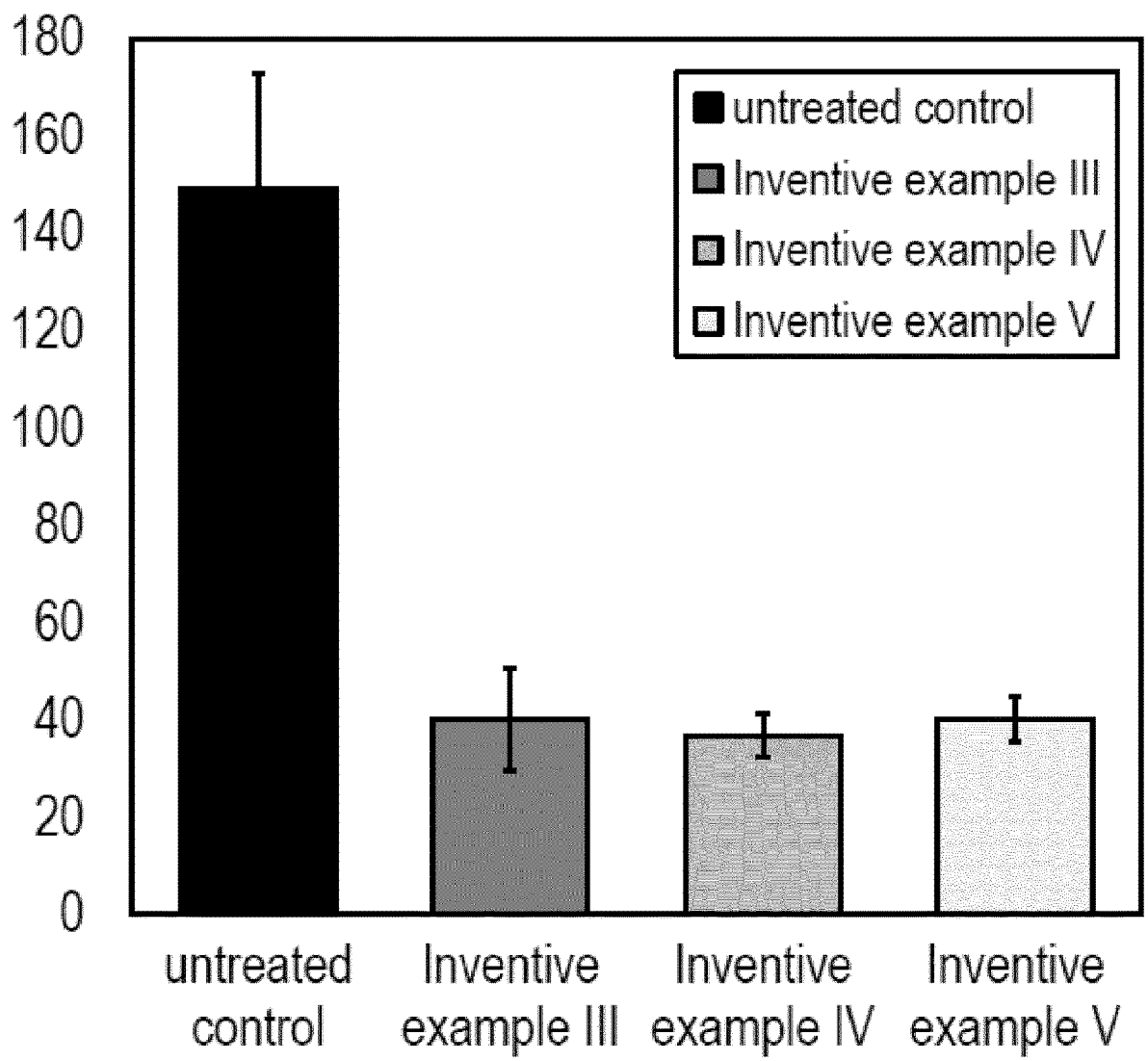
FIG. 11 shows a diagram showing the glowing time of the samples of FIG. 10.

FIG. 8 shows the maximum weight loss, FIG. 9 the burning rate of three inventive samples and one comparative sample which were tested without being leached according to EN 84 (1997). FIG. 10 shows burning time, FIG. 11 the glowing time of the three inventive samples without leaching of three inventive samples. Again in FIGS. 8 to 11 the improved fire resistance is clearly visible.

FIGS. 12 to 14 show the WPG (weight percentage gain), maximum weight loss and burning rate for Inventive Example III, Comparative Example I and untreated control. Again on FIGS. 12 to 14 the improved fire resistance is clearly visible.

The particular combinations of elements and features in the above detailed embodiments are exemplary only; the interchanging and substitution of these teachings with other teachings in this and the patents/applications incorporated by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. The invention's scope is defined in the following claims and the equivalents thereto. Furthermore, reference signs used in the description and claims do not limit the scope of the invention as claimed.

The invention claimed is:

1. A boron-free and halogen-free treatment composition for timber and/or wood, comprising:
    a) a fire-retardant comprising the moiety —N—C(=X)—N—with X being O, S, or substituted or unsubstituted nitrogen;
    and at least one of the components b) or c):
    b) a cross-linking agent whereby the cross-linking agent comprises a 2-imidazolidone moiety, or
    c) a fixing agent,
    whereby the composition is catalyst-free; and
    wherein halogen in halogen-free means free from halogen-containing compounds, halogens, and halogenides, with halogens selected from fluorine, chlorine, bromine, or iodine, and halogenides being selected from fluoride, chloride, bromide, or iodide.

2. The composition of claim 1, whereby the cross-linking agent comprises a compound of the following structure

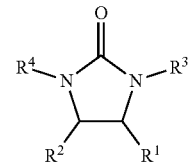

whereby
R¹ and R² are independently from each other OH or OR⁵ whereby R⁵ for every residue independently is C₁-C₅ alkyl, —CH₂O—C$_n$H$_{2n}$—OH, or —CH₂O—C$_n$H$_{2n}$—O—C$_m$H$_{2m}$OH with n and m being independently 2 or 3; and
R³ and R⁴ are independently from each other hydrogen, R⁵ for every residue independently, —CH₂OR⁵ for every residue independently, or CH₂OH.

3. The composition of claim 1, whereby the fixing agent comprises cyanoguanidin-diethylenetriamine-epichlorohydrin-polymer.

4. The composition of claim 1, whereby the fire retardant includes an urea and/or guanidine moiety.

5. The composition of claim 1, whereby the fire retardant is chosen from one of the following substances: urea, guanidine, or phenylguanidine salts.

6. The composition of claim 1, whereby the fire retardant comprises a phosphate.

7. The composition of claim 1, whereby the ratio (in wt/wt) of the fire retardant and the crosslinking agent (whereby when more than one crosslinking agent and/or fire retardant is present this relates to the total weight) is ≥0.05:1 to ≤10:1.

8. A timber and/or wood composite material whereby at least a part of the timber and/or wood of the composite material is impregnated with a composition according to claim 1.

9. An application method for applying a composition according to claim 1 onto a timber and/or wood to be treated, comprising the steps of:
  a) Optionally pre-drying the timber and/or wood to be treated,
  b) Impregnating the timber and/or wood to be treated with an aqueous solution of the composition at elevated pressure, and
  c) Drying the impregnated timber and/or wood.

10. The method of claim 9, whereby in step b) the content of the composition (in g per 100 ml water prior to addition) is ≥0.5 g to ≤80 g.

11. The method of claim 9, whereby step c) comprises at least two drying steps which are performed at different temperatures with the temperature increasing from each step to the other.

* * * * *